United States Patent
Robert et al.

(10) Patent No.: US 10,749,225 B2
(45) Date of Patent: Aug. 18, 2020

(54) THERMAL MANAGEMENT ASSEMBLY FOR TRACTION BATTERY CELLS

(71) Applicant: Ford Global Technologies, LLC, Dearborn, MI (US)

(72) Inventors: Brian Joseph Robert, St. Clair Shores, MI (US); Alvaro Masias, Ann Arbor, MI (US); Kent Snyder, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 564 days.

(21) Appl. No.: 15/458,278

(22) Filed: Mar. 14, 2017

(65) Prior Publication Data

US 2018/0269547 A1    Sep. 20, 2018

(51) Int. Cl.
| | |
|---|---|
| *H01M 10/625* | (2014.01) |
| *H01M 10/647* | (2014.01) |
| *H01M 10/6556* | (2014.01) |
| *H01M 10/6554* | (2014.01) |
| *H01M 10/613* | (2014.01) |
| *H01M 10/6557* | (2014.01) |
| *H01M 2/02* | (2006.01) |
| *H01M 2/10* | (2006.01) |

(52) U.S. Cl.
CPC ......... *H01M 10/625* (2015.04); *H01M 2/024* (2013.01); *H01M 2/0262* (2013.01); *H01M 2/0277* (2013.01); *H01M 2/0285* (2013.01); *H01M 2/0287* (2013.01); *H01M 2/1072* (2013.01); *H01M 2/1077* (2013.01); *H01M 10/613* (2015.04); *H01M 10/647* (2015.04); *H01M 10/6554* (2015.04); *H01M 10/6556* (2015.04); *H01M 10/6557* (2015.04); *H01M 2220/20* (2013.01)

(58) Field of Classification Search
CPC ............ H01M 10/6557; H01M 10/6567–6568
See application file for complete search history.

(56) References Cited

U.S. PATENT DOCUMENTS

| | | | | |
|---|---|---|---|---|
| 5,731,568 | A | * 3/1998 | Malecek | ............ B60H 1/00278 219/209 |
| 9,048,463 | B2 | 6/2015 | Lappe et al. | |
| 2006/0063067 | A1 | * 3/2006 | Kim | ...................... H01M 2/021 429/148 |
| 2013/0209856 | A1 | * 8/2013 | Lev | ..................... H01M 10/625 429/120 |
| 2015/0221995 | A1 | 8/2015 | Robert et al. | |
| 2016/0254577 | A1 | * 9/2016 | Ciampolini | ............. B60L 58/26 318/139 |

* cited by examiner

*Primary Examiner* — Robert S Carrico
(74) *Attorney, Agent, or Firm* — David Kelley; Brooks Kushman

(57) ABSTRACT

A vehicle traction battery assembly may include a traction battery cell, a case, and a thermal plate. The case may define a cavity to receive the traction battery cell and has a first side defining a first form feature. The thermal plate may be for positioning adjacent the traction battery cell and define a coolant channel sized for engagement with the case via the first form feature such that traction battery cell is in thermal communication with coolant flowing through the coolant channel. The first form feature may be serpentine-shaped or S-shaped. The first form feature may be castle-shaped from a cross-sectional plan view. The case may be multi-layered and include a first polymer layer, a second polymer layer, and an aluminum layer disposed between the polymer layers.

17 Claims, 4 Drawing Sheets

THERMAL MANAGEMENT ASSEMBLY FOR TRACTION BATTERY CELLS

TECHNICAL FIELD

This disclosure relates to thermal management assemblies for traction battery cells utilized in vehicles.

BACKGROUND

Electrified vehicles, such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes a traction battery cell, a case, and a thermal plate. The case defines a cavity to receive the traction battery cell and has a first side defining a first form feature. The thermal plate is for positioning adjacent the traction battery cell and defines a coolant channel sized for engagement with the case via the first form feature such that traction battery cell is in thermal communication with coolant flowing through the coolant channel. The first form feature may be serpentine-shaped or S-shaped. The first form feature may be castle-shaped from a cross-sectional plan view. The case may be multi-layered and include a first polymer layer, a second polymer layer, and an aluminum layer disposed between the polymer layers. The traction battery cell may further include a cell electrode structure retained by the second polymer layer. The first form feature may define spacing for the coolant channel to extend within an area defined by the cell electrode structure to enhance thermal communication therewith. The case may further have a second side defining a second form feature sized for engagement with another coolant channel of another thermal plate. The thermal plate may further define a coolant channel inlet and a coolant channel outlet. The coolant channel inlet and the coolant channel outlet may each be disposed on a same side of the thermal plate.

A vehicle traction battery assembly includes a traction battery, a case, and first and second spacers. The case defines a cavity sized to receive the traction battery cell and defines a form feature on each of opposing faces of the case. The first and second spacers are disposed on either side of the case and each defines a coolant channel sized to facilitate engagement with one of the form features. The traction battery cell may include a cell electrode structure. The form feature may further be defined such that one of the coolant channels extends within an area defined by the cell electrode structure. The case may include an aluminum layer disposed between two polymer layers to structurally reinforce the overall assembly. The coolant channel may define a first castle shape from a cross-sectional plan view and the form feature may be defined to form a second castle shape from a cross-sectional plan view offset from the first castle shape to facilitate thermal communication between coolant flowing through the coolant channel and the traction battery cell. The traction battery cell may be one of a pouch battery cell and a prismatic battery cell. Each of the coolant channels may include an inlet and outlet disposed on a same side of the respective spacer. The traction battery cell may include a cell electrode structure having layers to define a third form feature and a fourth form feature. The form features of the case may be formed by hard pressing a case first side and a case second side upon the cell electrode structure such that the form features of the case are defined by the third form feature and the fourth form feature.

A vehicle traction battery assembly includes battery cell assemblies and a plurality of thermal plates. Each of the battery cell assemblies includes a battery cell disposed within a housing. Each of the housings defines a first form feature on a first side and a second form feature on a second side. Each of the plurality of thermal plates is disposed between two of the battery cell assemblies and defines a coolant channel for engagement with the first form feature and the second form feature such that coolant flowing through the coolant channel is in thermal communication with the respective battery cell. The battery cell may include a cell electrode structure having layers to define a third form feature and a fourth form feature. The first form feature and the second form feature may be formed by hard pressing the first side and the second side upon the cell electrode structure such that the first form feature and the second form feature are defined by the third form feature and the fourth form feature. The coolant channel may define one or more routers to direct coolant flow between a first direction and a second direction. Each of the housings may include a first polymer layer, a second polymer layer, and an aluminum layer disposed therebetween. The coolant channel may define a first castle shape from a cross-sectional plan view. Each of the first form feature and the second form feature may define a second castle shape from a cross-sectional plan view. The first castle shape portion of the coolant channel and the second castle shape portion of the form features may be offset from one another such that the thermal plate and the housings engage with one another to enhance heat transfer between coolant flowing through the coolant channel and the battery cell. Each of the thermal plates may further define a coolant channel inlet and a coolant channel outlet disposed on a same side of the thermal plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
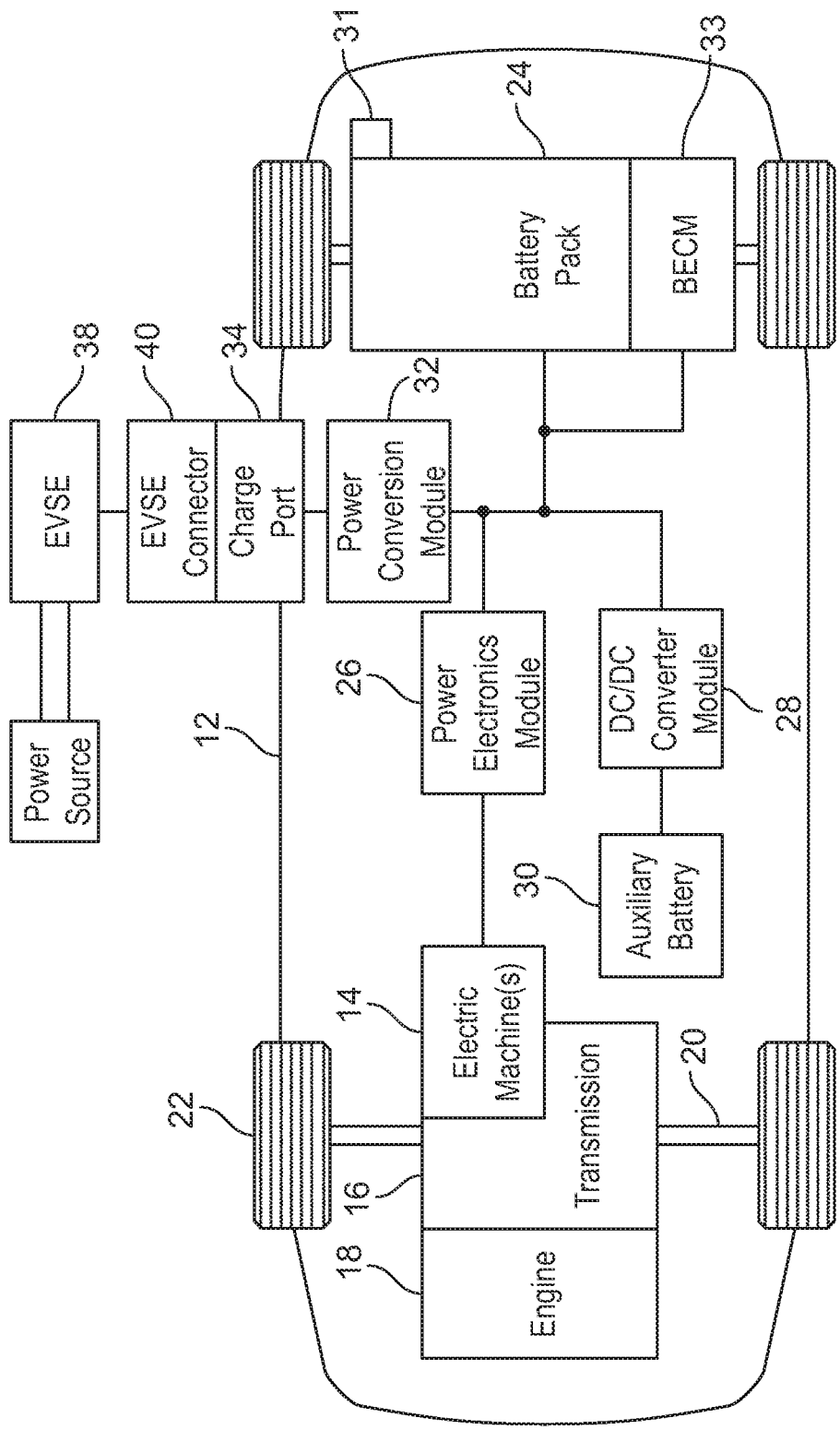
FIG. 1 is a schematic diagram illustrating an example of a battery electric vehicle.

FIG. 1 depicts an example of a schematic diagram for a PHEV. A vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 may be an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells of the traction battery 24, such as a prismatic or pouch-type cell, may include electrochemical elements that convert stored chemical energy to electrical energy. Prismatic cells or pouch-type cells may include a housing, a positive electrode (cathode) and a negative electrode (anode). An electrolyte may allow ions to move between the anode and cathode during discharge, and then return during recharge. Terminals may allow current to flow out of the battery cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Contact of the mating surfaces between a thermal plate and surfaces of battery cells is a factor which may affect heat transfer within a battery thermal management system and particularly with regard to conduction between the thermal plate and the battery cells. The mating surfaces may be uneven due to surface tolerances, and/or component irregularities which may result in gaps therebetween.

Figure 2:
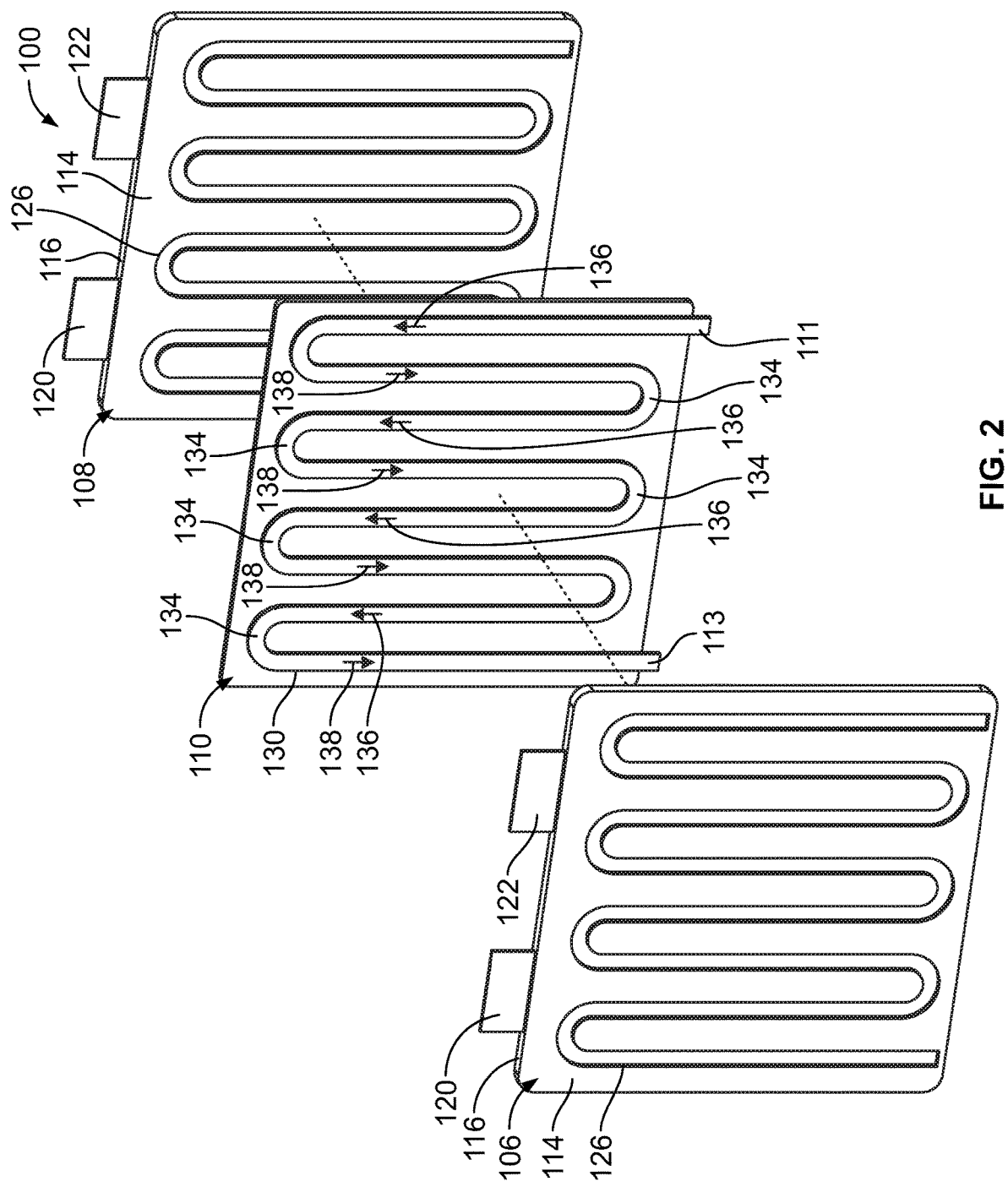
FIG. 2 is an exploded perspective view of a portion of a vehicle traction battery assembly.

FIG. 2 shows an exploded view of a portion of a traction battery assembly, generally referred to as a traction battery assembly 100 herein. This portion of the traction battery assembly 100 includes a first battery assembly 106, a second battery assembly 108, and a first thermal plate 110. The first thermal plate 110 may also be referred to as a spacer or a cold plate. Each of the first battery assembly 106 and the second battery assembly 108 may include a housing 114 defining a cavity to receive a battery cell 116. Each housing 114 may also be referred to as a case or outer packaging envelope and may be rigid or flexible depending upon a type of battery cell housed therein. Each of the first battery assembly 106 and the second battery assembly 108 may include various numbers of battery cells 116, such as ten to twenty. A plurality of battery cell assemblies may be electrically connected to one another and form an array. Additional thermal plates may be disposed between the battery cells 116 as further described below. The battery cells 116 may be, for example, pouch battery cells or prismatic battery cells. Each battery cell 116 includes a first terminal 120 and a second terminal 122. Each of the housings 114 further define a form feature 126. The battery cells 116 may generate heat during operation which requires thermal management such as external heating or cooling input depending upon ambient temperature conditions. The first thermal plate 110 may assist in managing thermal conditions of each of the battery cells 116.

For example, the first thermal plate 110 may define a coolant channel 130. The coolant channel 130 may have an inlet 111 to receive coolant and an outlet 113 for exiting coolant to flow through. The inlet 111 and the outlet 113 may be located on a same side of the first thermal plate 110. The coolant channel 130 may be shaped in various configurations to enhance heat transfer but not prevent coolant flow such as a fractal configuration or branching. In FIG. 2, the coolant channel 130 is shown being serpentine or S-shaped. The coolant channel 130 may be defined by the first thermal plate 110 to extend outward from a body thereof. The first thermal plate 110 and the battery cells 116 may be arranged with one another such that coolant flowing through the coolant channel 130 is in thermal communication with adjacent battery cells 116 to enhance heat transfer.

The coolant channel 130 may include a plurality of routers to assist in directing coolant flow from a first direction to a second direction. For example, the coolant channel 130 may include one or more routers 134 to assist in transitioning coolant flow between a first direction (represented by arrow 136) and a second direction (represented by arrow 138).

Figure 3:
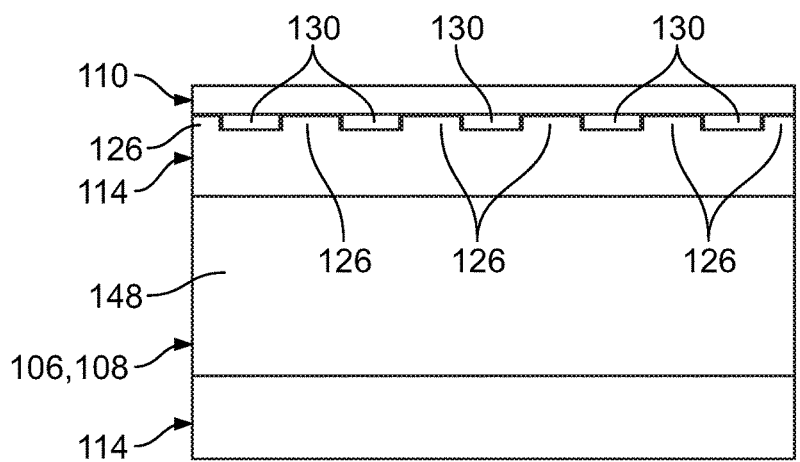
FIG. 3 is a plan view, in cross-section, of an example of a portion of the vehicle traction battery assembly of FIG. 2.
Figure 4:
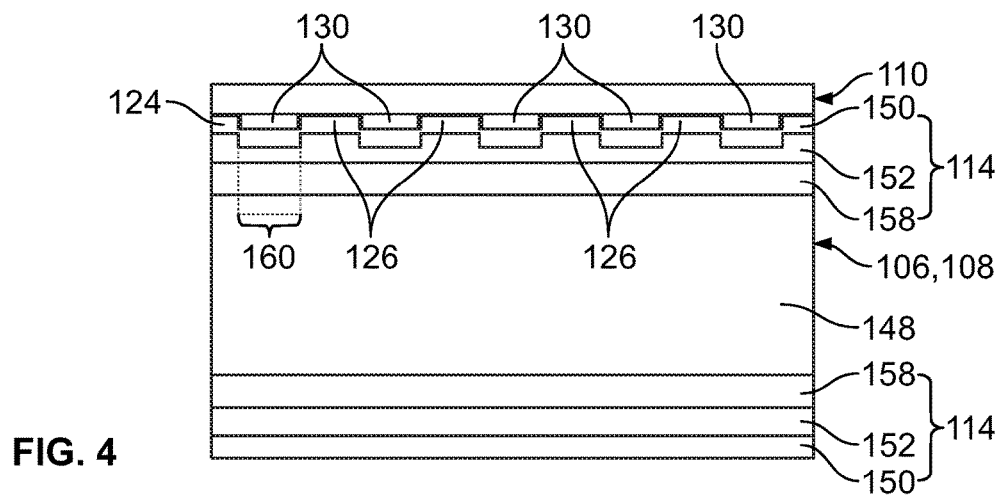
FIG. 4 is a plan view, in cross-section, of another example of a portion of the vehicle traction battery assembly of FIG. 2.
Figure 5:
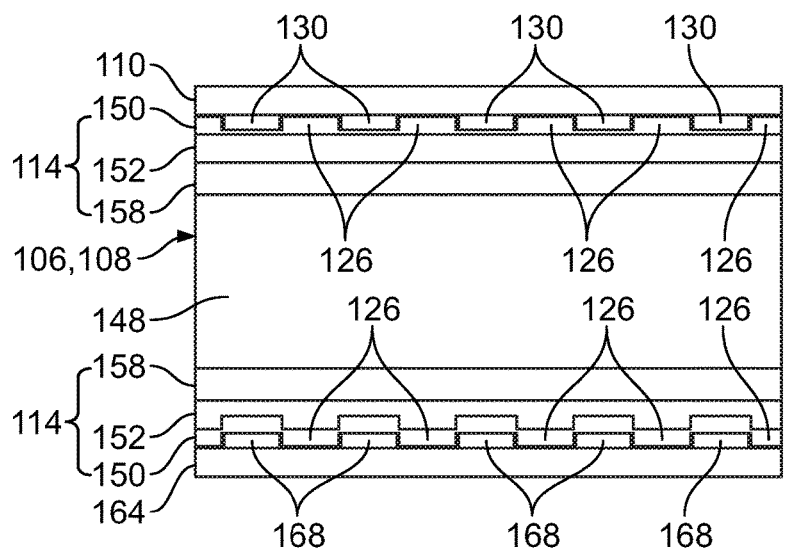
FIG. 5 is a plan view, in cross-section, of yet another example of a portion of the vehicle traction battery assembly of FIG. 2.

FIGS. 3 through 5 show cross-section plan views of example configurations of thermal plates and battery cell assemblies. Each of the housings 114 retain the respective battery cell 116 therein. In FIG. 3, the coolant channel 130 and the form feature 126 are shown offset from one another such that the first thermal plate 110 and the housing 114 may engage with one another. For example, the form feature 126 is defined by the housing 114 for insertion between portions of the coolant channel 130. The coolant channel 130 and the form feature 126 may each define a parapet-shaped configuration from a cross-section plan view. Each battery cell 116 may include a battery cell electrode structure 148 disposed within the housing 114. The battery cell electrode structure 148 may include an anode, a cathode, a separator and electrolyte to allow ions to move between the anode and cathode during discharge, and then return during recharge.

FIG. 4 shows cross-sectional plan view of an example configuration in which the housing 114 includes layers. For example, the housing 114 may include a first polymer layer 150, an aluminum layer 152, and a second polymer layer 158. The first polymer layer 150 may operate as a protective layer to isolate inner structures and to electrically isolate the aluminum layer 152. The aluminum layer 152 may operate to structurally reinforce the overall pouch assembly. The second polymer layer 158 may operate to isolate the battery cell electrode structure 148 from the aluminum layer 152 as well as operating as an edge sealing layer when assembling the pouch battery cell. One or more of the layers may be castle-shaped from a cross-sectional plan view or offset from the coolant channel 130 such that the coolant channel 130 is closer to the battery cell electrode structure 148 when the respective thermal plate is engaged with the respective housing. For example, the castle shape may be similar to a shape of castle parapets. Optionally, the form feature 126 may define spacing 160 for the coolant channel 130 to extend within an area defined by the battery cell electrode structure 148 to further enhance heat transfer between coolant flowing within the coolant channel 130 and the cell electrode structure.

FIG. 5 shows a cross-sectional plan view of an example configuration in which a first side and a second side of one housing 114 each define form features 126 to engage with adjacent thermal plates. In this example, a second thermal plate 164 is shown adjacent the first battery assembly 106 or the second battery assembly 108. The second thermal plate 164 may be similar in structure to the first thermal plate 110. For example, the second thermal plate 164 may define a coolant channel 168 for engagement with the form features 126 such that the first thermal plate 110 and the second thermal plate 164 may assist in managing thermal conditions of the battery cell disposed therebetween.

Figure 6:
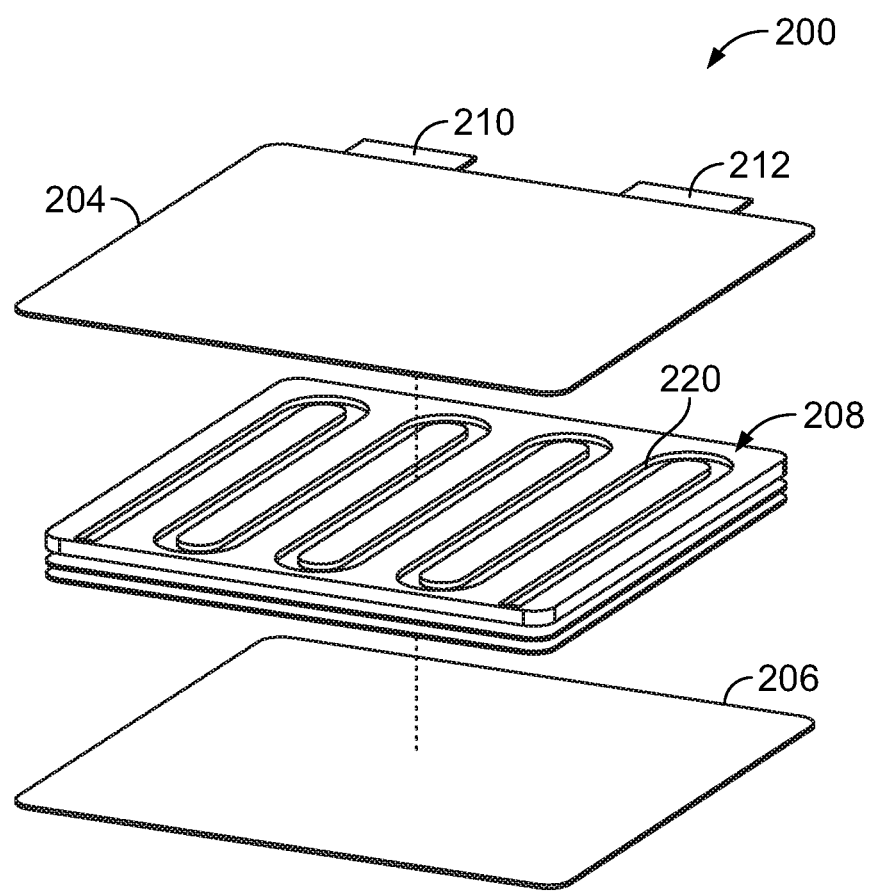
FIG. 6 is an exploded perspective view of an example of a portion of a vehicle traction battery cell assembly.
Figure 7:
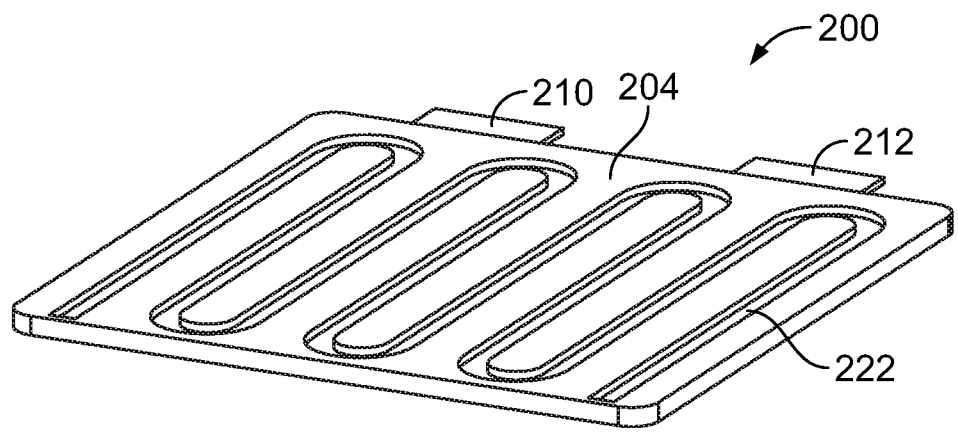
FIG. 7 is a perspective view of the example of the portion of the vehicle traction battery cell assembly of FIG. 6 shown assembled.

FIGS. 6 and 7 show another example of a portion of a traction battery cell assembly, referred to as a traction battery cell assembly 200. The traction battery cell assembly 200 includes a first side 204 of a pouch battery cell case, a second side 206 of the pouch battery cell case, a battery cell electrode structure 208, a first terminal 210, and a second terminal 212. The first side 204 and the second side 206 may be of a polymer material having malleable characteristics to facilitate form pressing. Examples of form pressing include deforming, stamping, and vacuum sealing. The battery cell electrode structure 208 may include an anode, a separator, a cathode, a separator, and electrolyte to allow ions to move between the anode and cathode during discharge, and then return during recharge. The battery cell electrode structure 208 may define a form feature 220. For example, by alternating layers of the anode, the separator, and the cathode, planar or patterned topologies may be established to create structured features effectively deposited within the cell. The battery cell electrode structure 208 may define another similar form feature on an opposite side (not visible in FIG. 6). Form pressing the first side 204 and the second side 206 to the battery cell electrode structure 208 may then create a form feature 222. The form feature 222 may be sized to engage with coolant channels of adjacent thermal plates similar to the relationship between the first thermal plate 110 and the battery assembly 106.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
a plurality of battery cells, wherein each battery cell is retained in a case; and
a thermal plate positioned between two adjacent battery cells, the thermal plate defining a coolant channel that extends outwardly from at least one side of the thermal plate, wherein each case includes a preformed form feature that conforms to the coolant channel on one side of the thermal plate.

2. The assembly of claim 1, wherein the preformed form feature is serpentine-shaped or S-shaped.

3. The assembly of claim 1, wherein the preformed form feature has a first square wave shape including a first plurality of alternating recesses and protrusions, and wherein each case has a second square wave shape including a second plurality of alternating recesses and protrusions, wherein the first and second plurality of alternating recesses and protrusions are secured together with the recesses of the first square wave shape receiving the protrusions of the second square wave shape and the protrusions of the first square wave shape being received in the recesses of the second square wave shape.

4. The assembly of claim 1, wherein each battery cell is multi-layered and includes a first polymer layer, a second polymer layer, and an aluminum layer disposed between the polymer layers.

5. The assembly of claim 4, wherein each battery cell further comprises a cell electrode structure retained by the second polymer layer, wherein the preformed form feature defines spacing for the coolant channel to extend within an area defined by the cell electrode structure to enhance heat transfer from the battery cells to the thermal plate.

6. The assembly of claim 1, wherein each case further has a second side defining a second form feature sized for engagement with another coolant channel of another thermal plate.

7. The assembly of claim 1, wherein the thermal plate further defines a coolant channel inlet and a coolant channel outlet, and wherein the coolant channel inlet and the coolant channel outlet are each disposed on a same side of the thermal plate.

8. A vehicle traction battery assembly comprising:
a plurality of battery cells, wherein each battery cell has a case having first and second oppositely facing sides that include a first plurality of protrusions separated by a first plurality of recesses; and
a plurality of thermal plates each defining a coolant channel that extends outwardly from first and second sides of the thermal plate, the thermal plates having a second plurality of protrusions separated by a second plurality of recesses on the first and second sides of the thermal plate, wherein the first protrusions of the case are received in the second recesses on the first and second sides of the thermal plate, respectively.

9. The assembly of claim 8, wherein each case includes an aluminum layer disposed between two polymer layers to structurally reinforce the vehicle traction battery assembly.

10. The assembly of claim 8, wherein the battery cell is one of a pouch battery cell and a prismatic battery cell.

11. The assembly of claim 8, wherein each of the coolant channels includes an inlet and outlet disposed on a same side of the thermal plate.

12. The assembly of claim 8, wherein the battery cells each include a cell electrode structure having layers that define a third plurality of protrusions separated by a third plurality of recesses, and wherein the first protrusions and first recesses and second recesses of the case are embossed into the cell electrode structure of the battery cell to form the third protrusions and third recesses.

13. A vehicle traction battery assembly comprising:
a plurality of battery cells each disposed within a housing, each of the housings defining a third plurality of protrusions separated by a third plurality of recesses on a first side and a second side; and
a plurality of thermal plates each disposed between two of the battery cells the thermal plates defining coolant channels extending outwardly from first and second sides of the thermal plate, the thermal plate including a second plurality of protrusions that protrude from first and second sides of the thermal plates, wherein the first side of the thermal plates is fully received in the first protrusions and first recesses and the second side of the coolant channel is fully received in the first protrusions and first recesses such that coolant flowing through the coolant channels are in thermal communication with the respective battery cells.

14. The assembly of claim 13, wherein the battery cells each include a cell electrode structure having layers including a third plurality of protrusions separated by a third plurality of recesses, and wherein the first protrusions and first recesses are formed by hard pressing the first side and the second side of the thermal plates upon the cell electrode structure such that the first protrusions and first recesses conform to the third protrusions and first recesses.

15. The assembly of claim 13, wherein the coolant channel defines one or more routers to direct coolant flow between a first direction and a second direction.

16. The assembly of claim 13, wherein each of the housings includes a first polymer layer, a second polymer layer, and an aluminum layer disposed therebetween.

17. The assembly of claim 13, wherein each of the thermal plates further defines a coolant channel inlet and a coolant channel outlet disposed on a same side of the thermal plate.

* * * * *